United States Patent Office 3,558,328
Patented Jan. 26, 1971

3,558,328
FERMENTING WHEY AND PRODUCING SOY SAUCE FROM FERMENTED WHEY
Anthony J. Luksas, Chicago, Ill., assignor to Beatrice Foods Co., Chicago, Ill., a corporation of Delaware
No Drawing. Filed July 8, 1968, Ser. No. 743,014
Int. Cl. A23c 21/00; A23l 1/22
U.S. Cl. 99—145    6 Claims

ABSTRACT OF THE DISCLOSURE

Whey is fermented with a combination of a lactase enzyme and *Saccharomyces cerevisiae* under aerobic conditions with agitation to obtain a fermented type soy sauce. This can be mixed with nonfermented soy sauce of hydrolyzed vegetable protein to give a fermented oriental type soy sauce flavor.

---

The present invention relates to the preparation of a fermented type soy sauce.

It is an object of the present invention to prepare a novel fermented type soy sauce.

Another object is to prepare an intense soy sauce flavor.

A further object is to prepare a novel flavor from whey.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by fermenting whey using a mixture of a lactase enzyme and *Saccharomyces cerevisiae* or lactase producing microorganism and *Saccharomyces cerevisiae*. Examples of lactase producing organisms: *Saccharomyces fragilis, sac lactis*.

The fluid whey is normally pasteurized before adding the enzyme. Pasteurization can be accomplished under conventional pasteurization conditions, e.g. 145° F. for 30 minutes or 161° F. for 15 seconds or there can be used higher temperatures and shorter time periods, e.g. 300° F. for 30 seconds, 310° F. for 15 seconds or 1 second, 245° F. for 15 minutes, 260° F. for 10 minutes.

Following pasteurization there is added to the fluid whey a lactase enzyme such as Pectinol 42E concentrate. The Pectinol 42E concentrate is added as a powder in an amount of 0.025 to 5%, preferably 0.1%, of the liquid system. The higher amount of enzyme decreases the fermentation time but increases the cost. After adding the enzyme the system is innoculated with *Saccharomyces cerevisiae* and the mixture aerated and agitated throughout the fermentation. Preferably fermentation is carried out at 26° C. but this can be varied, e.g. from 16° C. to 40° C. Stirring and agitation are continued for 12 to 24 hours. It is critical that *Saccharomyces cerevisiae* be used since *Saccharomyces fragilis, Saccharomyces lactis* and *Saccharomyces unisporum* by themselves do not produce the characteristic flavor.

An intense flavor develops as a result of the growth of the *Saccharomyces cerevisiae* and the lactase enzyme on the whey. This intense flavor composition can be combined with a nonfermented soy sauce or a hydrolyzed vegetable protein to obtain a fermented oriental type soy sauce flavor.

Thus, there can be employed 2 parts of fermented whey to 1 part of soy sauce by volume, or 1 part of fermented whey to 1 part of soy sauce by volume or 5 parts of fermented whey to 1 part of soy sauce by volume. As little as 0.5 part of fermented whey can be used with 1.5 parts by volume of soy sauce. There can be added extra salt as desired, e.g. 5% salt on a dry basis. There can be 18% salt by weight in the final liquid product to act as a preservative. The ferment acts as an extender for fermented soy sauce.

EXAMPLE 1

Whey was pasteurized at 161° F. for 15 seconds. Then there was added 0.1% by weight of Pectinol 42E concentrate (a lactase) and the system was innoculated with *Saccharomyces cerevisiae*. The mixture was continuously agitated strongly for 18 hours and at the same time air was passed into the mixture constantly. An intense flavor developed.

EXAMPLE 2

To 2 parts of the fermented whey prepared in Example 1 there was added 1 part of soy sauce by volume to obtain a fermented oriental type soy sauce flavor.

EXAMPLE 3

To the product of Example 2 there was added 18% salt by weight as a preservative.

I claim:
1. A process of preparing fermented whey comprising adding to whey (1) a lactase and (2) *Saccharomyces cerevisiae* and allowing the fermentation to continue with agitation and aeration until an intense flavor develops.
2. A process according to claim 1 wherein the fermentation is continued for 12 to 24 hours.
3. A fermented whey product prepared by the process of claim 1.
4. A soy sauce prepared by admixing nonfermented soy sauce with the fermented whey prepared in claim 3.
5. A soy sauce according to claim 4 wherein there are from ⅓ to 5 parts of fermented whey per part of nonfermented soy sauce by volume.
6. A soy sauce according to claim 5 including added salt.

References Cited
UNITED STATES PATENTS
2,128,845    8/1938    Myers et al. _____ 99—59

A. LOUIS MONACELL, Primary Examiner
W. A. SIMONS, Assistant Examiner

U.S. Cl. X.R.
99—57, 59